US009170579B1

(12) United States Patent
Witter et al.

(10) Patent No.: US 9,170,579 B1
(45) Date of Patent: Oct. 27, 2015

(54) SYSTEM, METHOD AND COMPUTER PROGRAM PRODUCT FOR MONITORING AND CONTROLLING INDUSTRIAL ENERGY EQUIPMENT

(71) Applicant: Blue Pillar, Inc., Indianapolis, IN (US)

(72) Inventors: Bradley Jay Witter, Carmel, IN (US); Kyle Patrick Zeronik, Carmel, IN (US)

(73) Assignee: Blue Pillar, Inc., Indianapolis, IN (US)

( * ) Notice: Subject to any disclaimer, the term of this patent is extended or adjusted under 35 U.S.C. 154(b) by 457 days.

(21) Appl. No.: 13/753,908

(22) Filed: Jan. 30, 2013

(51) Int. Cl.
G05B 19/423 (2006.01)
G05B 19/042 (2006.01)

(52) U.S. Cl.
CPC .. *G05B 19/0423* (2013.01); *G05B 2219/21012* (2013.01); *G05B 2219/25061* (2013.01); *G05B 2219/25066* (2013.01)

(58) Field of Classification Search
None
See application file for complete search history.

(56) References Cited

U.S. PATENT DOCUMENTS 6,446,202 B1 * 9/2002 Krivoshein et al. ............... 713/1
2011/0106328 A1 * 5/2011 Zhou et al. .................... 700/291

\* cited by examiner

*Primary Examiner* — Kenneth M Lo
*Assistant Examiner* — Geoffrey Wellman
(74) *Attorney, Agent, or Firm* — Lessani Law Group, PC (57) ABSTRACT

A digital energy system monitors and controls a plurality of industrial energy devices. The system includes a server and one or more interface devices coupled to the industrial energy devices. Each of the interface devices has a dynamically configurable runtime environment. The server sends configuration data to each of interface devices. The configuration data includes variable definitions that reference specific registers on the industrial energy devices. The server monitors the industrial energy devices by obtaining values for one or more of the variables set forth in the variable definitions. To control an industrial energy device, the server sends a write request for the industrial energy device to the interface device with a value for a defined variable in the device definition for the industrial energy device.

20 Claims, 10 Drawing Sheets

Prior Art

WriteValue()

SYSTEM, METHOD AND COMPUTER PROGRAM PRODUCT FOR MONITORING AND CONTROLLING INDUSTRIAL ENERGY EQUIPMENT

BACKGROUND OF THE INVENTION

1. Field of the Invention

This invention relates generally to digital energy networks and more specifically to monitoring and controlling industrial energy equipment.

2. Description of the Background Art

For enterprises where power is critical, it is desirable to integrate power consumption and power generation devices into a digital energy network that enables centralized monitoring and management of the devices. For example, a hospital needs to monitor its power supply and energy consumption to ensure it has adequate power for all the equipment in the hospital. If there is a disruption in the main power supply, the hospital needs to switch to backup power sources, and it may need to quickly turn off certain non-essential equipment. Similarly, an industrial manufacturing facility may want to monitor its power supply and consumption to ensure it is using energy efficiently. It may switch between energy sources and turn on/off equipment in order to lower the cost of its energy expenses.

Figure 1:
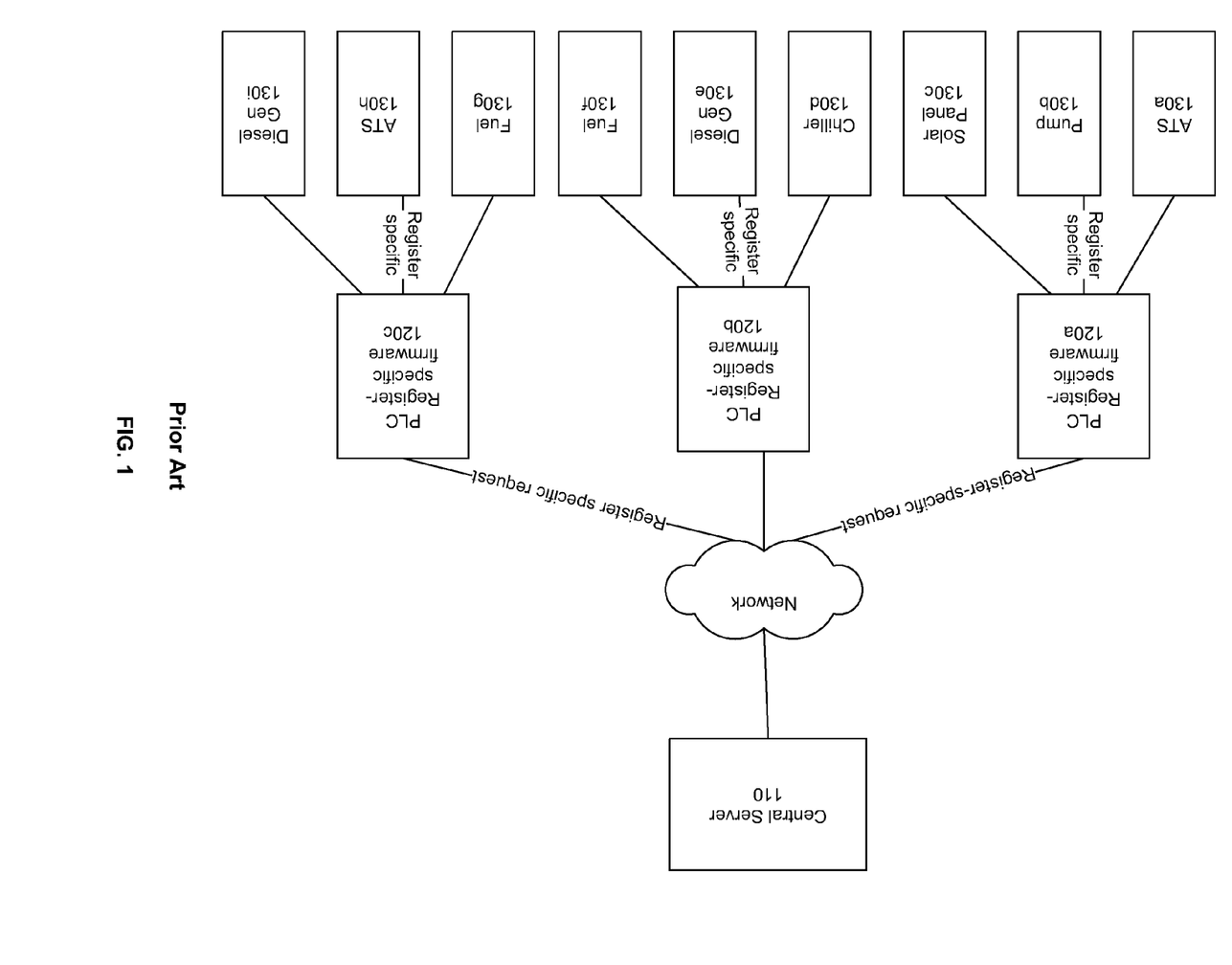
FIG. 1 is a block diagram of a prior art digital energy network.

FIG. 1 illustrates an example of a typical digital energy network. A central server 110 (within an enterprise or in the cloud) monitors and controls an enterprise's industrial energy equipment, which includes power consumption and power generation devices 130a-130i. The central server obtains output data from and sends control data to the industrial energy equipment via programmable logic controllers (PLCs) 120a-120c. Specifically, the PLCs obtain raw output data from the equipment, normalize the data, and send it to the central server. Similarly, to control industrial energy equipment, the central server sends control data to the PLCs, which then write the data to specific memory registers in the equipment.

An enterprise/facility may have many different types of industrial energy devices. Generators, switchgears, automatic transfer switches, fuel systems, pumps, chillers, renewable energy sources, and building automation systems are just a few examples. There are usually multiple manufacturers and models for each type of device. Also, the age of the devices can vary greatly. The PLCs may be connected to recently built devices as well as machines that are twenty or thirty years old. Each PLC in a digital energy network may be connected to a different combination of devices.

There is no universal interface for reading and writing data from all these different types of industrial equipment devices. Instead, for each device, data must be read from and written to specific memory registers based on specifications obtained from the manufacturer of the device. Currently, an automation protocol, such as Modbus, is used for communications between the central server and the PLCs, as well as between the PLCs and the industrial energy devices. The PLCs are programmed on a "register-by-register" basis. Specifically, firmware loaded onto each PLC specifies the registers on the industrial energy devices at which output data is to be obtained and the registers on the PLC at which the data should be stored. The firmware may also instruct the PLC to perform a certain calculation (e.g., scale) on data in specified registers and the store the results in other specified registers. When the central server requests the data from the PLC, it references specific register addresses and a port on the PLC. Thus, the central server must know the register addresses at which desired data is stored on the PLC. To do this, an input/output (I/O) register map is created that maps registers on the industrial energy devices to registers on the PLC. The I/O map must specify specific input and output ports via which data can be retrieved. Each input and output on the PLC must be preconfigured and mapped to registers within the PLC.

Configuring the PLCs is tedious, expensive, and time consuming because the combination of devices to which a PLC is connected can vary greatly. There are two ways in which the PLCs are currently configured. One way is to load custom firmware on each PLC. To do this, an I/O register map must be created for the specific devices connected to that PLC. If the devices connected to the PLC change, the I/O register map and the firmware for the PLC must be changed as well.

Another way to configure the PLCs is load the same firmware on each PLC. Such firmware must anticipate all the likely combinations of devices that will be coupled to the various PLCs. To do this, registers, inputs, and outputs must be reserved on each PLC for each potential device that may be connected to the PLC. For example, if eight chillers may be connected to a PLC, then registers need to reserved on the PLC for eight chillers. If there are three different manufacturers of chillers, then registers need to be reserved for twenty-four chillers (eight from each manufacturer), as each manufacturer will require a different I/O register map. The firmware code set becomes enormous and essentially unmanageable once all the potential types of devices, manufacturers, and models are taken into account. In addition, there may not be enough registers on the PLCs to account for all the various combinations. Moreover, every time there is a change to the configuration file, all the PLCs must be updated.

In view of the above, it is clear that this is a great need for an easier and more efficient way to monitor and control energy devices.

SUMMARY OF THE INVENTION

The present invention provides a system, method, and computer program product for monitoring and controlling a plurality of industrial energy devices. Industrial energy devices (also referred to herein as industrial energy equipment) are industrial power generation devices (e.g., a diesel generator, a solar panel, fuel cell, uninterruptable power supply, wind turbine, etc), industrial power consumption devices (e.g., chillers, pumps, boilers, lighting systems, etc.), electrical switching equipment (e.g., automatic transfer switch), and/or utility meters and submeters.

The system of the present invention includes a server and one or more interface devices coupled to the industrial energy equipment. Each of the interface devices has a dynamically configurable runtime environment. The server sends configuration data to each of interface devices. The configuration data received at each interface device corresponds to the industrial energy equipment coupled to the interface device. If there is a change in the equipment coupled to the interface device, the configuration data is updated by the server. The configuration data includes (i) a port definition for each port on the interface device coupled to an industrial energy device and (ii) a device definition for each industrial energy device coupled to the interface device. Each device definition specifies a unique ID and network address for one of the industrial energy devices, memory registers at which data is to be from and written to the industrial energy device, and one or more variables definitions that references data at specific registers on the industrial energy device.

In response to receiving configuration data, an interface device reads the configuration data and dynamically configures its ports in accordance with the port definitions in order to read data from and write data to the industrial energy equipment coupled to the interface device. The interface device also dynamically allocates memory on the interface device for defined variables in the device definitions.

The interface device periodically obtains raw output data from the industrial energy equipment at the network addresses and from the memory registers specified in the device definitions. In one embodiment, the device definitions each include one or more data block definitions for each industrial energy device. A data block definition specifies a block of memory registers on an industrial energy device. In this embodiment, data is retrieved in the form of a data block at the specific memory registers set forth in a data block definition.

The interface device uses the retrieved raw output data from each industrial energy device to determine the value of the variables defined in the device definition for the device. In one embodiment, there are at least two types of variables: (i) variables that reference specific registers on an industrial energy device (referred to herein as "input/output variables") and (ii) formulas that reference one or more of the input/out variables. In this embodiment, for each data item retrieved from a register on an industrial energy device, the interface device determines whether there is an input/output variable for the industrial energy device that references that data item. If so, the interface device determines a value for the input/output variable. Once the all the retrieved data items have been processed (and hence values for the corresponding input/out variable determined), the interface device calculates the value of the formula variables.

The server monitors the industrial energy equipment by obtaining values for one or more of the variables set forth in the variable definitions. In other words, output data from the industrial energy equipment is passed to the server in the form of a variable name/value pair. The data obtained by the server may then be used to display the status of the industrial energy equipment in a dashboard, to generate reports, and to control the equipment.

To control an industrial energy device, the server sends a write request for the device to the interface device with a value for a defined variable in the device definition for the industrial energy device. The interface device uses the variable definition for the defined variable to identify the memory register on the industrial energy device to which the value should be written, and then writes the data to the applicable register. For example, changing a bit from a one to zero on an industrial energy device may cause the device to go offline or to set an alarm.

Passing data between the server and the interface device in the form of a name variable/value pair differs from the prior art where read and write requests from the server must specify particular memory registers on the PLC. Enabling the server to obtain data in the form of variable name/value means that registers need not be reserved on the interface device for each potential type of equipment that could be connected to the interface device. Templates for configuration data can be created and stored in a library for each type of industrial energy device. The templates can be downloaded to the interface device as needed. Each interface device can be easily, uniquely, and dynamically configured using the templates for the industrial energy equipment coupled to the interface device.

DETAILED DESCRIPTION OF THE PREFERRED EMBODIMENTS

The present invention provides a system, method, and computer program product for monitoring and controlling industrial energy equipment. As stated above, industrial energy equipment are industrial power generation devices (e.g., a diesel generator, a solar panel, fuel cell, uninterruptable power supply, wind turbine, etc), industrial power consumption devices (e.g., chillers, pumps, boilers, lighting systems, etc.), electrical switching equipment (e.g., automatic transfer switch), and/or utility meters and submeters.

Figure 2:
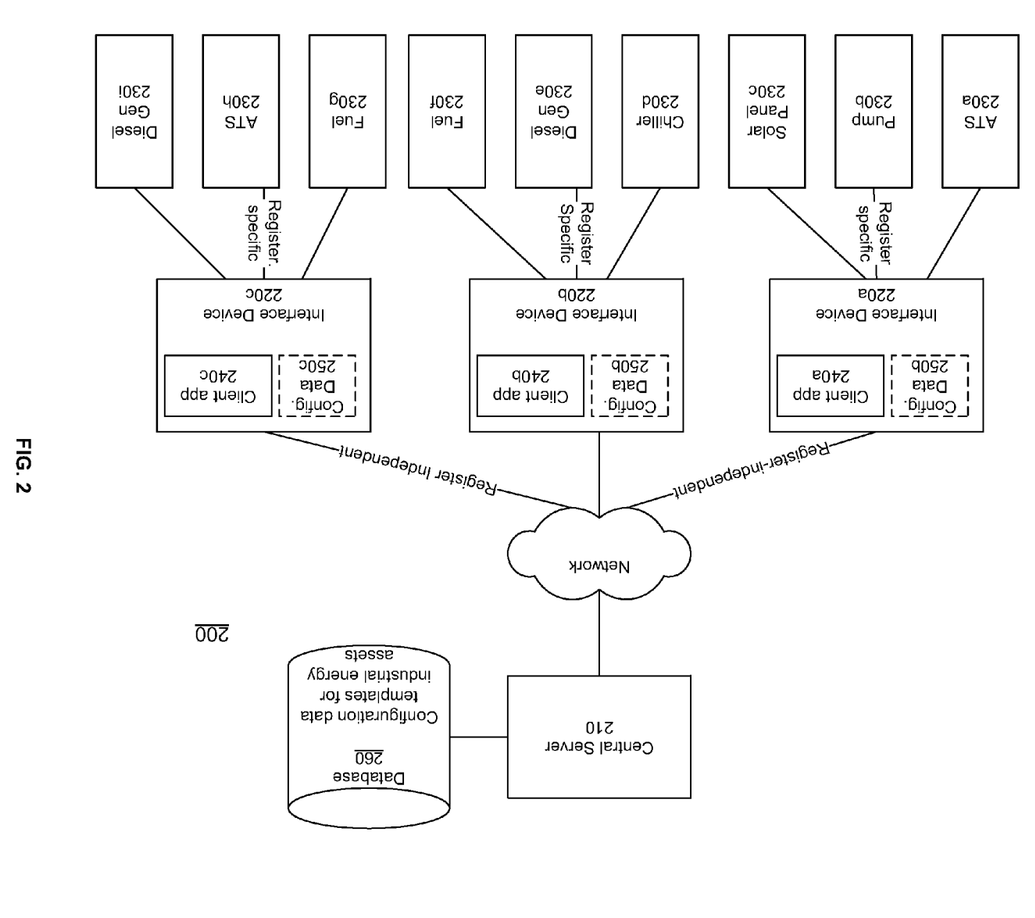
FIG. 2 is a block diagram of a digital energy network according to one embodiment of the present invention.

FIG. 2 illustrates an example of a digital energy system for monitoring and controlling industrial energy equipment according to one embodiment of the invention. The system includes one or more central servers 210 and one or more interface devices 220 coupled to the industrial energy equipment 230. The interface devices 220 read data from and write data to the industrial energy equipment 230 to enable the equipment 230 to be centrally monitored and controlled by server 210.

In one embodiment, read and write requests from the interface devices 220 to the industrial energy equipment 230 specify specific registers on the equipment 230. In contrast, and for reasons discussed below, communications between the server 210 and interface devices 220 do not specify registers on the interface devices 220. Examples of the protocol used for communications between the interface devices 220 and the industrial equipment are ModBus, BacNet, and LonWorks. In one embodiment, configuration data is sent from central server 210 to interface devices 220 via web services, and real-time data is sent from the interface devices 220 to the central sever using OPC UA.

Each of the interface devices 220 has a dynamically configurable runtime environment. Server 210 configures each interface device by sending configuration data 250 to each interface device. The configuration data received at each interface device 220 corresponds to the industrial energy equipment 230 coupled to the interface device. If there is a change in the equipment 230 coupled to the interface device, the configuration data is updated by the server. Server 210 may be a single, central server or a network of servers.

In one embodiment, an interface device 220 is a microserver that executes a client software application 240. The client application 240 reads the configuration data 250 and performs the functions described herein with respect to the interface devices 220. FIGS. 4-7 (discussed below) illustrate an example of the operation of client application 240.

Figure 3A:
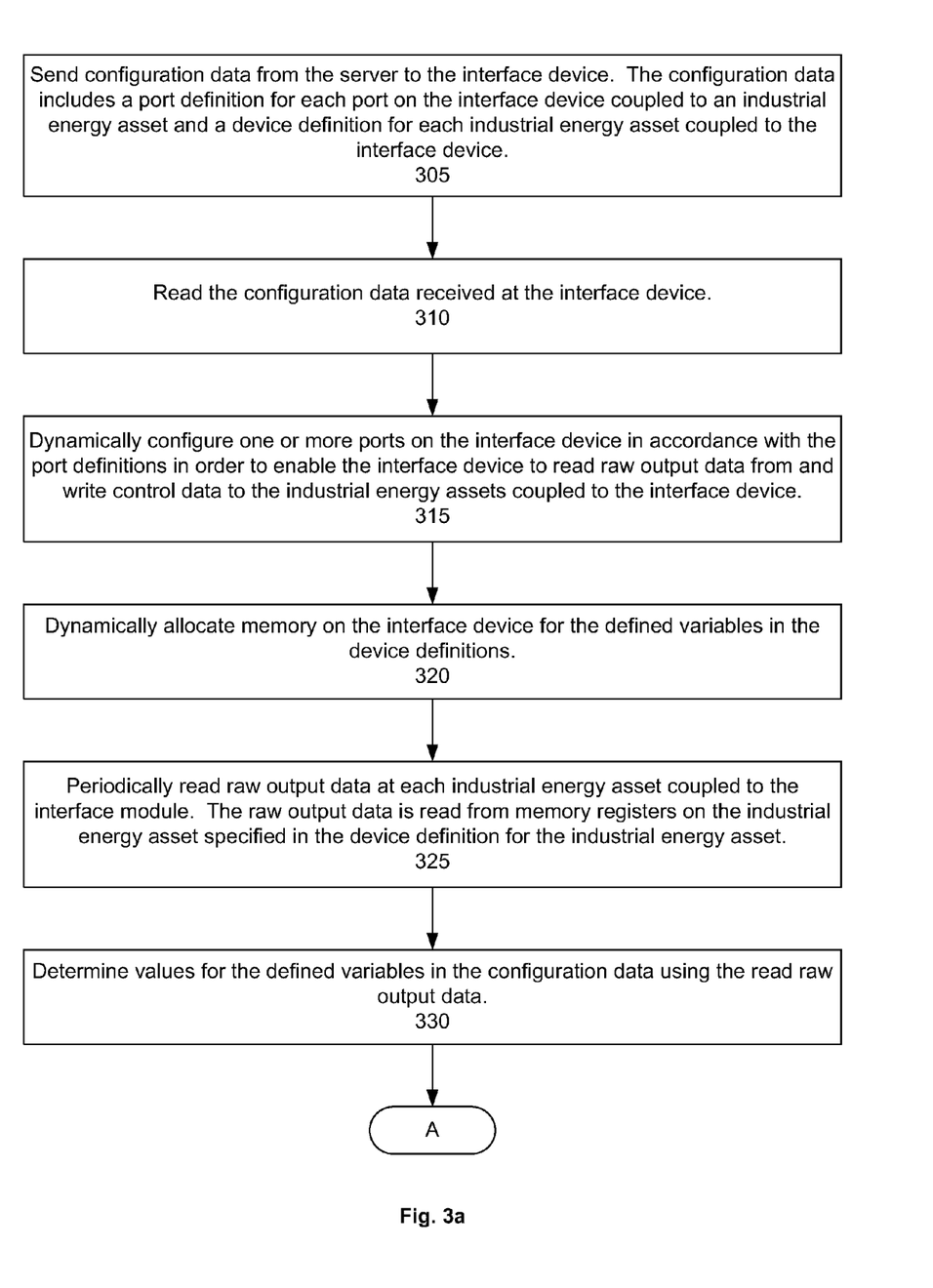
FIGS. 3a-b are a flowchart illustrating a method for monitoring and controlling industrial energy equipment according to one embodiment of the present invention.
Figure 3B:
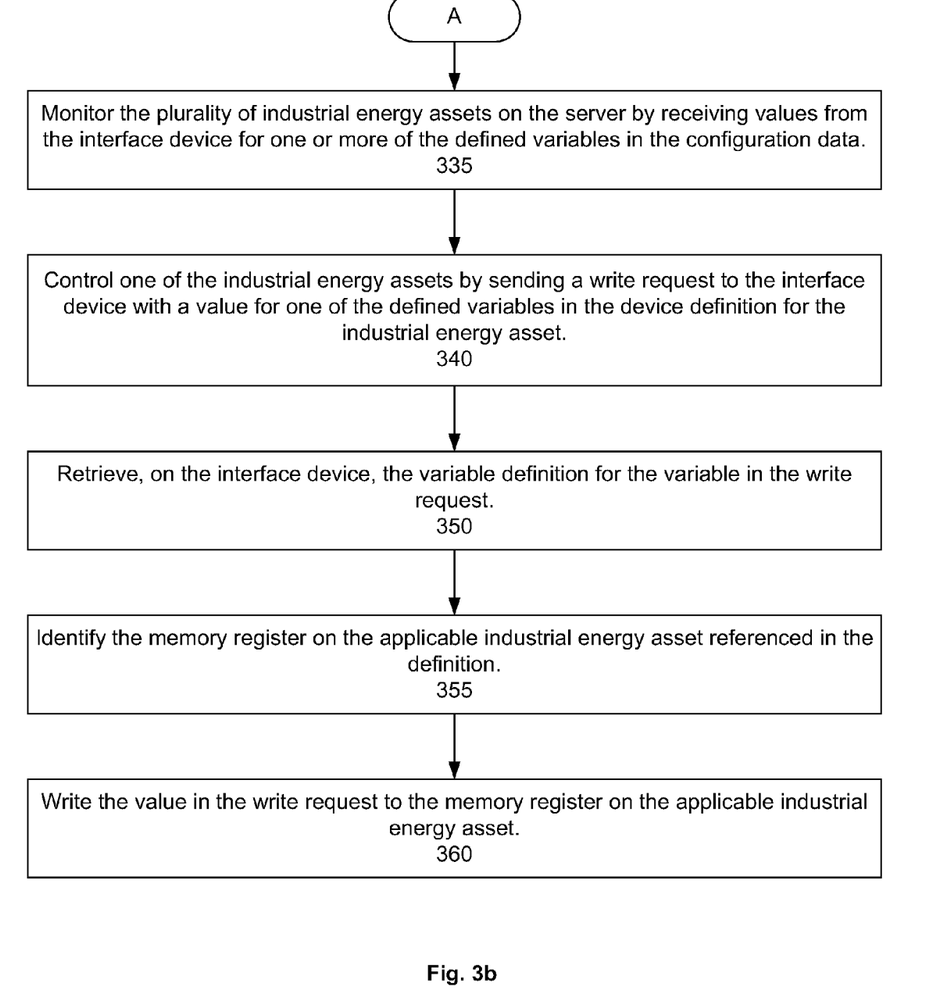

FIG. 3 illustrates a method for monitoring and controlling industrial energy equipment according to one embodiment of the invention. FIG. 3 is described with respect to one interface device, but an enterprise may have multiple interface devices, and the method of FIG. 3 would be applicable to all the interface devices.

As indicated above, the central server sends an interface device configuration data (step 305). The configuration data includes (i) a port definition for each port on the interface device coupled to an industrial energy device and (ii) a device definition for each industrial energy device coupled to the interface device. Each device definition specifies a unique ID and network address for one of the industrial energy devices, memory registers at which data is to be read from and written to on the industrial energy device, and one or more variables definitions that references data at specific registers on the industrial energy device. An example of configuration data is set forth at the end of this description.

In response to receiving configuration data, an interface device reads the configuration data (step 310) and dynamically configures its ports in accordance with the port definitions in order to read data from and write data to the industrial energy equipment coupled to the interface device (step 315). The interface device also dynamically allocates memory on the interface device for defined variables in the device definitions (step 320).

The interface device periodically obtains raw output data from the industrial energy equipment at the network addresses and from the memory registers specified in the device definitions (step 325). The term "periodically" as used herein is not limited to regular intervals, and the output data can be obtained at irregular intervals, on demand from the server, and/or in response to a condition. In one embodiment, the device definitions each include one or more data block definitions for each industrial energy device. A data block definition specifies a block of memory registers on an industrial energy device. In this embodiment, data is retrieved in the form of a data block at the specific memory registers set forth in a data block definition.

The interface device uses the retrieved raw output data from each industrial energy device to determine the value of the variables defined in the device definition for the device (step 330). In one embodiment, there are at least two types of variables: (i) variables that reference specific registers on an industrial energy device (referred to herein as "input/output (I/O) variables") and (ii) formulas that reference one or more of the input/out variables. In this embodiment, for each data item retrieved from a register on an industrial energy device, the interface device determines whether there is an input/output variable for the industrial energy device that references that data item. If so, the interface device determines a value for the input/output variable. Once the all the retrieved data items have been processed (and hence values for the corresponding input/out variable determined), the interface device calculates the value of the formula variables.

The server monitors the industrial energy equipment by obtaining values for one or more of the variables set forth in the variable definitions (step 335). In other words, output data from the industrial energy equipment is passed to the server in the form of a variable name/value pair. The server may request values from the interface device, or the interface device may be configured to automatically push data to the server 210 whenever a value changes for a variable, whenever the interface device reads data from an industrial energy device, and/or at defined intervals. The data obtained by the server may be used to display the status of the industrial energy equipment in a dashboard, to generate reports, and to control the equipment.

To control an industrial energy device, the server sends a write request for the device to the interface device with a value for a defined variable in the device definition for the industrial energy device (step 340). For example, changing a bit from a one to zero on an industrial energy device may cause the device to go offline or to set an alarm. In response to receiving a write request, the interface device retrieves the applicable variable definition to identify the memory registers on the applicable industrial energy device to which the value should be written (steps 350, 355), and then writes the data to the applicable register (360).

Enabling the server to obtain data in the form of variable name/value means that registers need not be reserved on the interface device for each potential type of equipment that could be connected to the interface device. Communications between the server and interface device pertaining to the industrial energy equipment do not depend on or specify the registers at which the interface device stores data from the industrial energy equipment (i.e., communications are register independent). Consequently, the same configuration data for industrial energy devices of the same make and model can be used across interface devices. As a result, templates for configuration data can be created and stored in a library for each type (i.e., make and model) of industrial energy device. The template data can be downloaded to and removed from the interface device as needed. Each interface device can be easily, uniquely, and dynamically configured using the templates for the industrial energy equipment coupled to the interface device.

In the system illustrated in FIG. 2, database 260 stores configuration data templates for different types of industrial energy devices 230. In one embodiment, the configuration data sent each interface device 220 comprises the configuration template data for each industrial energy device 230 coupled to the interface device 220. For example, the configuration data sent interface device 220a would include the configuration template data for ATS 230a, pump 230b, and solar panel 230c. Similarly, the configuration data sent interface device 220c would include the configuration template data for fuel pump 230g, ATS 230h, and diesel generator 230i. If ATS 230a and 230h are the same make and model, then the configuration data for these devices would be identical (regardless of the registers in which the interface devices store data). In one embodiment, configuration template data is automatically aggregated for each interface device 220 by server 210 or other computer system.

FIGS. 4-7 illustrate an example operation of an interface device. Those skilled in the art will appreciate that an interface device may operate in different ways and still be within the scope of the invention.

Figure 4:
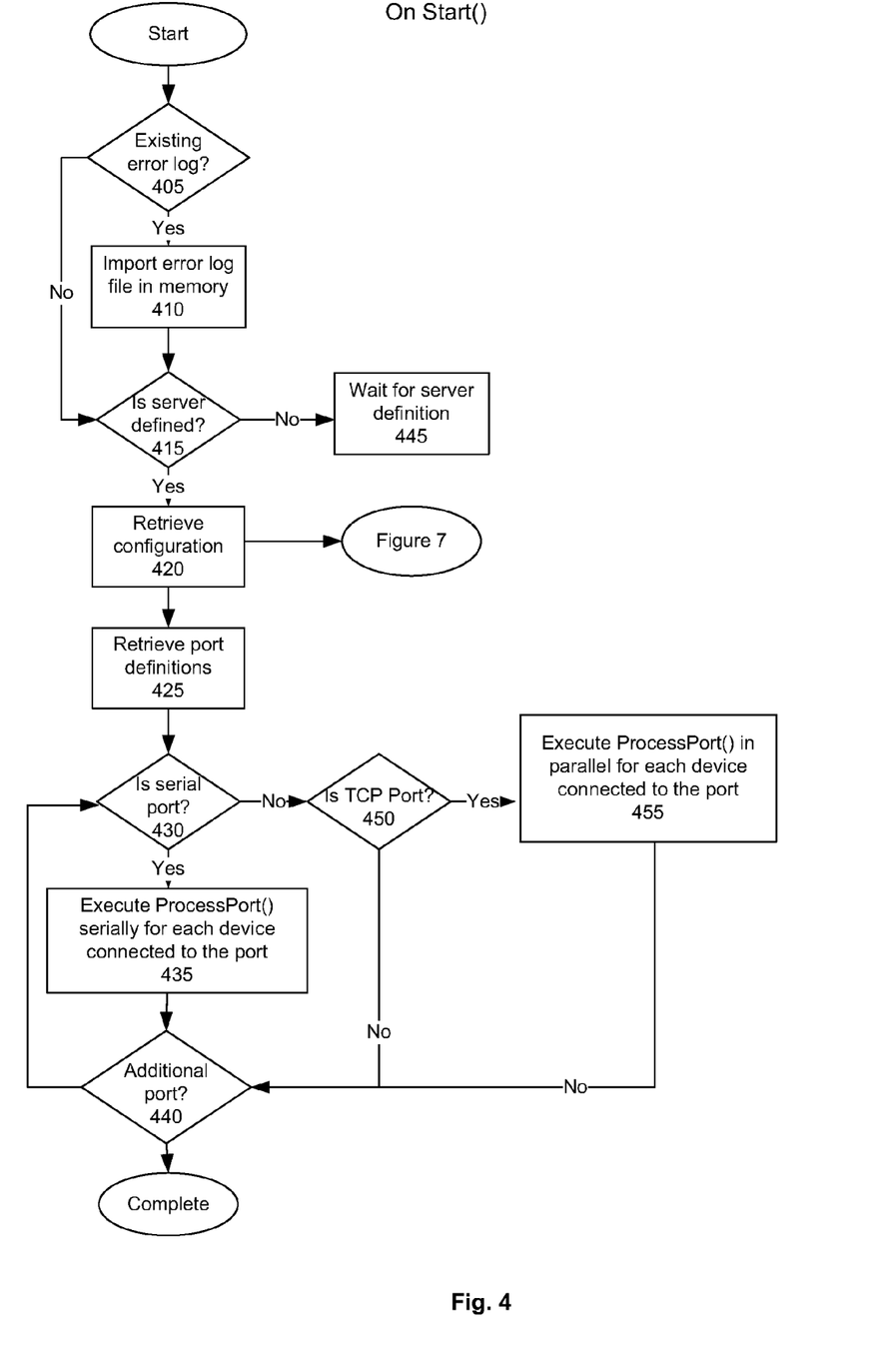
FIG. 4 is a flowchart that illustrates the start up operation of an example interface device according to one embodiment of the present invention.

FIG. 4 illustrates an example start up operation for an interface device 220 according to one embodiment of the invention. Upon start up, the interface device determines if there is an existing error log from the last time the interface device ran (step 405). The interface device maintains an error log to note certain operational information, such when an industrial energy device is not responding. If there is an existing error log, it imports the error log into memory (step 410). The interface device then determines if a central server 210 with which it can communication has been defined (step 415). If not, it waits for a definition, or searches for one (i.e., polls other devices in a local area network). If a central server is defined, it requests configuration data from the central server (step 420). After receiving the configuration data, it retrieves the port definitions in the configuration data and begins processing the ports listed in the port definitions (step 425). Specifically, it retrieves the first port definition and determines whether or not the port is a serial port or a TCP port (steps 430, 450). If the port is a TCP port, then the interface device executes the "ProcessPort( )" function (FIGS. 5*a*-5*b*) in parallel for each industrial energy device coupled to the port (step 455). If the port is a serial port, then the interface device executes the "ProcessPort( )" function serially for each industrial energy device coupled to the port (step 435). This process repeats until all the ports have been processed (step 440).

Figure 5A:
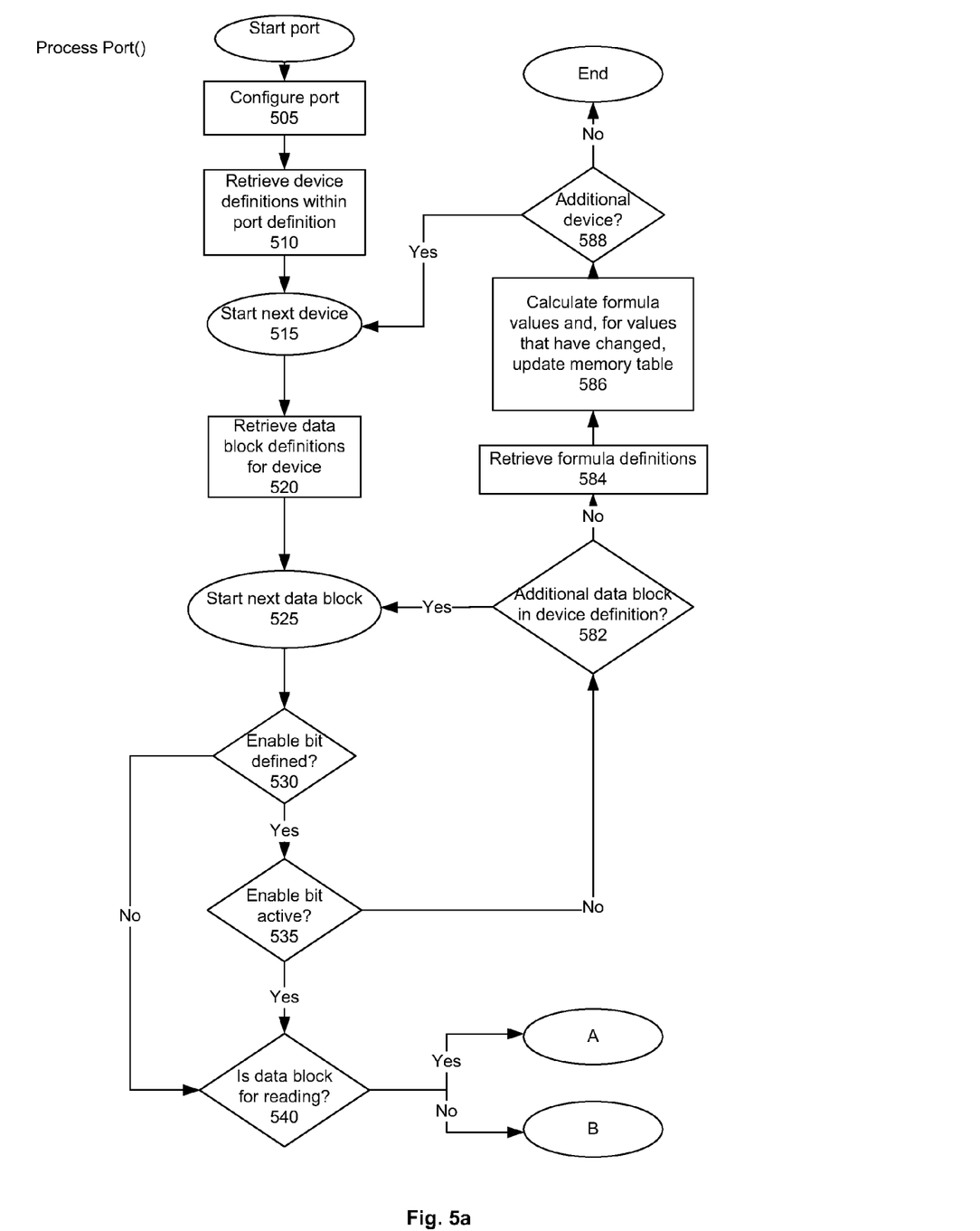
FIGS. 5a-5c are a flowchart that illustrates an example method for processing ports (by an interface device) according to one embodiment of the invention.
Figure 5B:
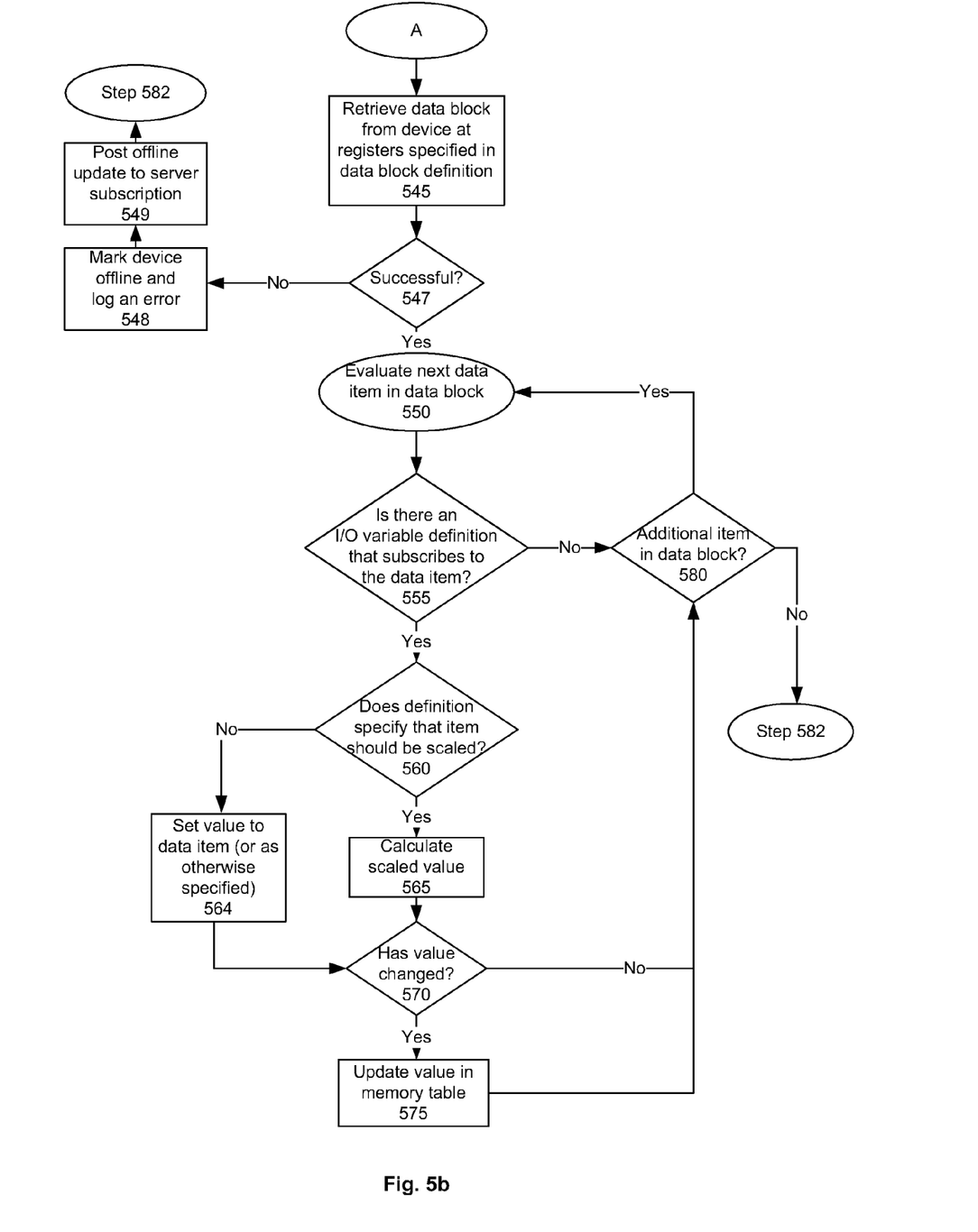
Figure 5C:
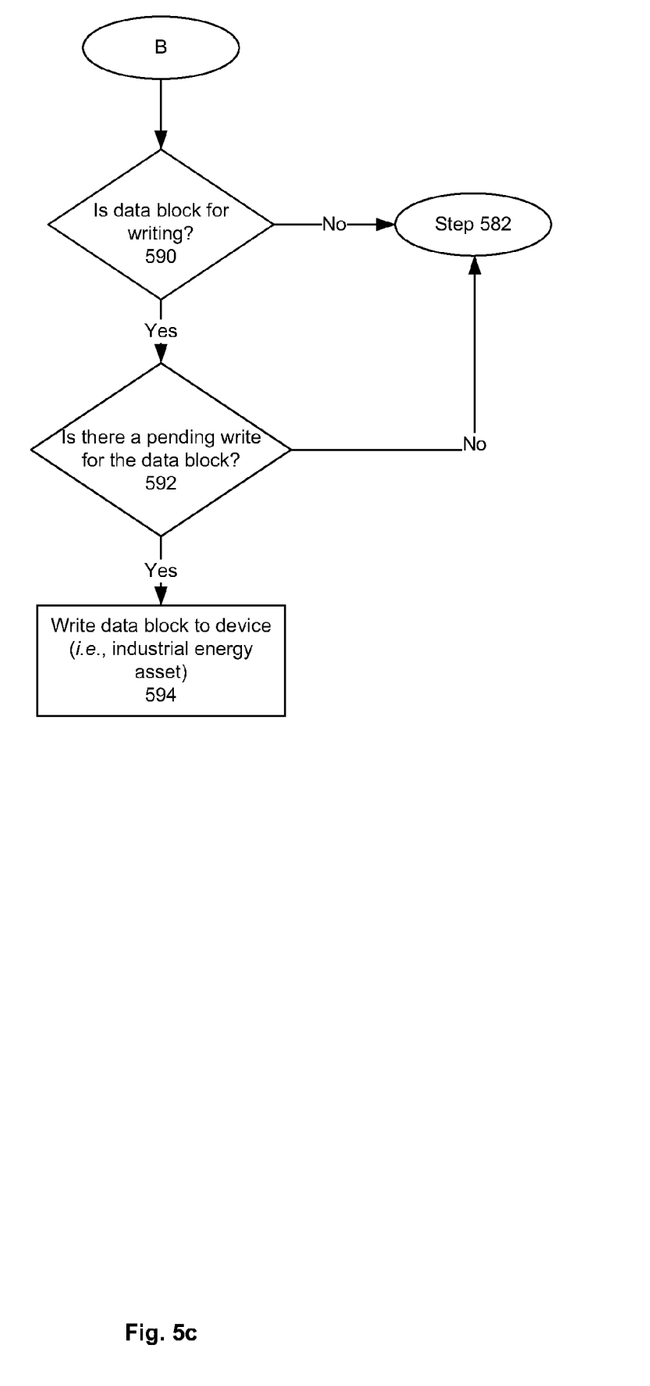

FIGS. 5*a*-5*c* illustrate the ProcessPort( ) function for an interface device. For the port being processed, the interface device configures the port in accordance with the port definitions (step 505). Each port definition includes one or more device definitions, and the interface device then retrieves the device definitions within the port definition. The interface device then begins processing for each device defined within the port definition (step 515).

Each device definition includes one or more data block definitions. The interface device retrieves data block definitions for the applicable device, and initiates processing for each data block defined within the device definition. A data block is a block of memory registers. For each data block, the interface device determines whether the data block definition defines an enable bit. In one embodiment, an enable bit is a variable that has a value of "1" when it is active and a value of "0" when it is inactive. The purpose of an enable bit is that it allows data blocks to be defined without requiring an interface device to process the data block if information in the data block is not needed. If the enable bit is defined and inactive, the interface device moves on to the next data block (if any) within the device definition (see steps 582). If there is no enable bit or if the enable bit is active, the interface device determines if the data block is for reading (step 540). If so, the interface device retrieves the data block from the applicable industrial energy device at the memory registers specified in the data block definition. If the retrieval was unsuccessful, the interface device marks the industrial energy device as offline, logs an error in the error log, and posts an offline update to the server read subscription described with respect to FIG. 7 (steps 548, 549). In one embodiment, when an industrial energy device is offline, the industrial energy device is put into a "slow poll" mode, and output data from the device is read less frequently than online devices.

If the retrieval was successful, the interface device begins evaluating each data item within the data block (i.e., each data item within a memory register). For each data item, the interface device determines if there is an input/output (I/O) variable that references the data item. If not, it proceeds to step 580 and moves on to the next data item, data block, or device as applicable. If so, it determines if the variable definition specifies that the data item should be scaled (steps 580). In response to the definition specifying that the data items should be scaled, the interface device scales the data item and sets the value of the variable to the scaled value (step 565). Otherwise, the value of the variable is equal to the data item (or set as otherwise specified in the variable definition). In one embodiment, a definition may include a conditional statement, and determining the value of the variable comprises evaluating the conditional statement (e.g., setting the value to "1" if the condition is satisfied, and setting the value to "0" if the condition is not satisfied). If the value of the variable has changed, the interface device updates the value of the variable in a memory table from which variable values will be retrieved for transmission to the central server. The interface device then proceeds to step 580. If there is another data item to be processed within the data block, steps 550-580 are repeated for the next data item. Otherwise, the interface device proceeds to step 582 and determines if there is an additional data block in the current device definition. If there is another data block, steps 525-582 are repeated for the data block.

Returning to step 540, if data block is for writing, the interface device determines if there is a pending write for the data blocks (steps 590, 592). If so, it writes the data block to the applicable industrial energy device (i.e., the device associated with the device definition currently being process). Otherwise, it returns to step 582 and determines if there is another data block within the current device definition.

Once all the data blocks within a device definition have been processed, the interface device retrieves any formula definitions within the current device definitions. In one embodiment, formula definitions reference I/O variables for which values were calculated in steps 560-568. Using the most recent values for the I/O variables, it calculates values for the defined formulas, and, if any values have changed, it updates the memory table with stored values accordingly.

If there is another device within the port definition to be processed, the steps of FIGS. 5*a*-5*c* are repeated for the next device. In the preferred embodiment, step 588 will always evaluate to no for TCP ports because ProcessPort( ) is executed in parallel for each device connected to a TCP port.

Figure 6:
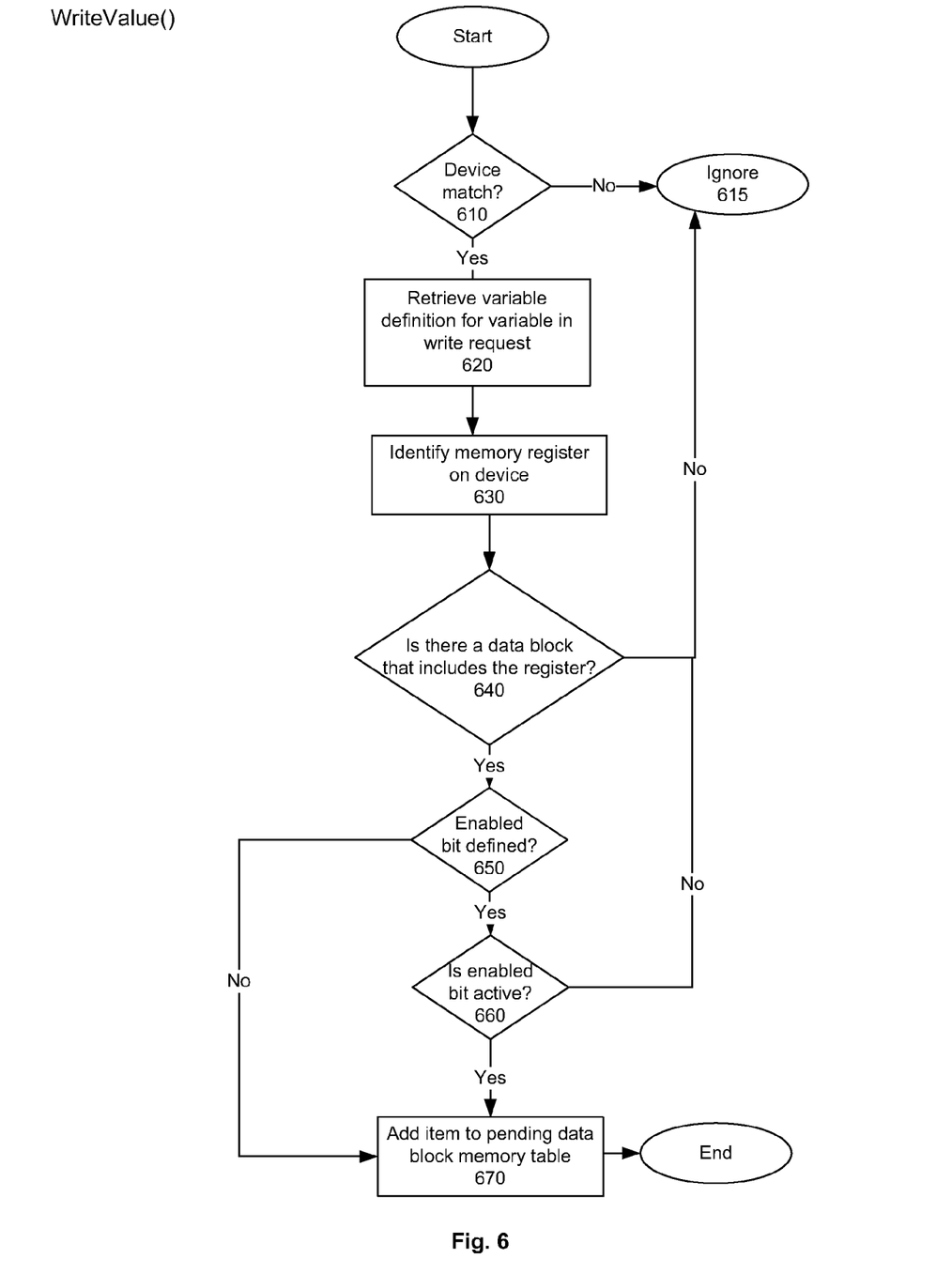
FIG. 6 is a flowchart that illustrates a write operation of an example interface device according to one embodiment of the invention.

FIG. 6 illustrates an example operation of an interface device in response to receiving a write request from a central server. A write request from a server specifies a value for a variable for a particular device. Upon receiving a write request, the interface device determines if the specified device is one of the industrial energy devices coupled to the interface device (step 610). If not, it ignores the write request (step 615). If so, it retrieves the applicable device and variable definitions for the device and variable specified in the write request (step 620). From the variable definition, it identifies the memory register on the industrial energy device that corresponds to the variable (step 630). It then determines, if the there is a data block defined that includes the memory register (step 640). In response to finding a defined data block that includes the memory register, the interface device determines if the data block includes a definition for an enable bit (step 650), and, if so, it determines whether or not the enable bit is active (step 660). If no data block exists or if the enable bit is inactive, the interface device ignores the write request (step 615). If there is no enable bit or if the enable bit is defined and active, the interface device adds the variable value specified in the write request to a table in memory with the pending values for the data block (step 670). When the data block is processed during the ProcessPort( ) operation, the value in the write request is written to the applicable industrial energy device.

Figure 7:
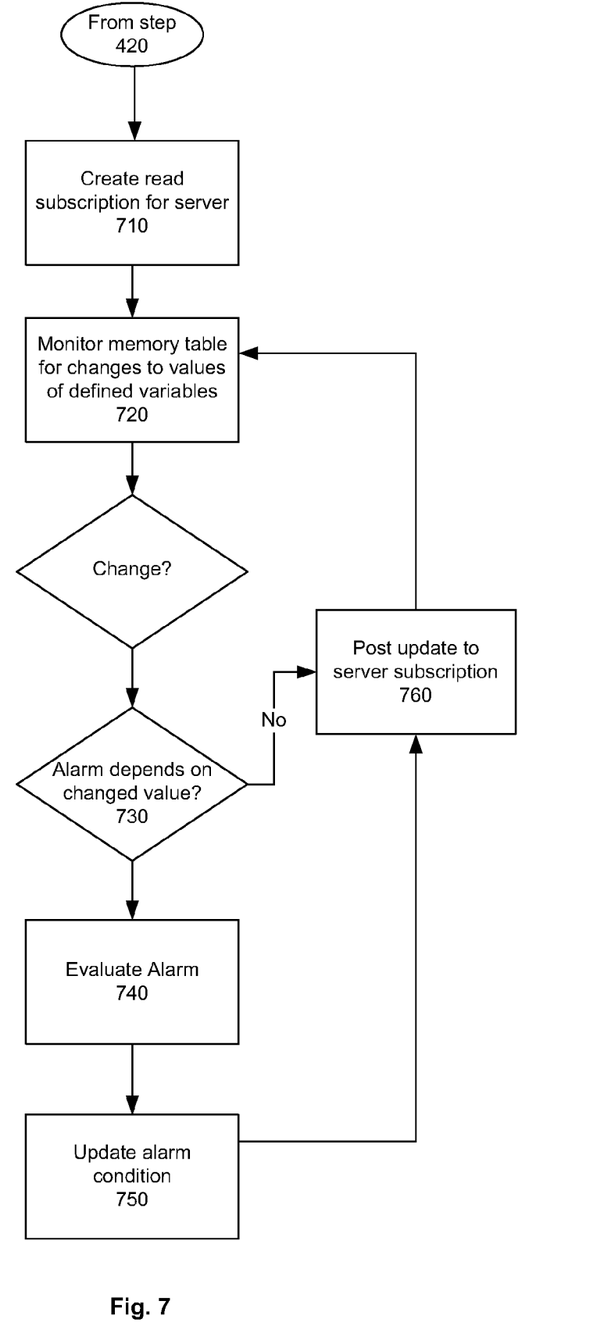
FIG. 7 is a flowchart that illustrates an example of a process of transmitting data from the interface device to the central server.

FIG. 7 illustrates an example of a process of transmitting data from the interface device to the central server. After the interface device obtains configuration data from the central server, the interface device creates a read subscription for the server (step 710). It then monitors the memory table in which values for defined variables are stored for changes (step 720). In response to detecting a change to a value, the interface device determines if the changed value relates to an alarm (step 730). An alarm may be a variable defined within the configuration data. If the changed value does not pertain to an alarm, the interface device posts the changed value to the server subscription (step 760). If the changed value pertains to an alarm, the interface device evaluates the alarm and updates the alarm condition (step 740, step 750). It then posts an update with the alarm condition to the server subscription (step 760). The values are transmitted in variable name/value pairs to the server. The values may be transmitted in real time (as values are updated), at defined intervals, or in response to a request from the server.

The methods described with respect to FIGS. 3-7 are embodied in software and performed by a computer system (comprising one or more computing devices) executing the software. A person skilled in the art would understand that a computer system has a memory or other physical, computer-readable storage medium for storing software instructions and one or more processors for executing the software instructions.

As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

EXAMPLE CONFIGURATION DATA

Below is example configuration data for an interface device with the unique ID "microServerId."

```
ms=new Microserver
{
   Id=microServerId,
   IpAddress="1.1.1.1",
   Model="Blue Pillar IM",
   Name="RTU1",
   Version="7.0",
   LastUpdatedDateTime=System.Convert.ToDateTime
("Oct. 16, 2012 11:50 AM"),
   Ports=new
List<BluePillar.Avise.Service.AviseObjectModel.Port>
   {
      new SerialPort
         {
            BaudRate=BaudRateType.Baudrate9600,
            DataBits=DataBitsType.Databits8,
            Id="/dev/ttyAP0",
            PortType=PortType.ModbusRtu,
            Parity=ParityType.None,
            StopBits=StopBitsType.Stopbits1,
            Retries=3,
            TimeOut=5000,
            PollDelayMs=0,
            Devices=new List<Device>
               {
               new Device
               {
               Id="Device1",
               Name="VerisMeter",
               SlaveDeviceAddress=2,
               DataBlocks=new List<DataBlock>
               {
               new DataBlock
               {
               Id=Guid.NewGuid( ).ToString( ),
               RegisterBlockType=ModbusDataType.FloatReadwrite,
               Size=24,
               StartingRegister=261,
               DataBlockType=DataBlockType.Read,
               ZeroBasedAddressingFor32BitType=true
               }
               },
               Items=new List<Item>
               {
               new Item
               {
               Id=Guid.NewGuid( ).ToString( ),
               Name="VerisMeter2Offline",
               DataType=ItemDataType.Discrete,
               Formula="IsDeviceOffline(Device1)"
               },
               new ItemIo
               {
               Id=Guid.NewGuid( ).ToString( ),
               Name="KW",
               DataType=ItemDataType.Analog,
               MicroServerId=microServerId,
               ItemAddress="40261",
               Units="kW",
               OpcItemAddress="ATS1_KW"
               },
               new Item
               {
               Id=Guid.NewGuid( ).ToString( ),
               Name="NORMAL_KW",
               DataType=ItemDataType.Analog,
               Formula="IF([IN_NORMAL_POSITION]
=\"True\",[KW],0.0)",
               Units="kW",
               OpcItemAddress="ATS1_NORMAL_KW"
               }
               }
               }
               ,
               new Device
               {
               Id="Device2",
               Name="ATS_IO",
               SlaveDeviceAddress=5,
               DataBlocks=new List<DataBlock>
               {
               new DataBlock
               {
               Id=Guid.NewGuid( ).ToString( ),
               RegisterBlockType=ModbusDataType.DiscreteRead,
               Size=12,
               StartingRegister=1,
               DataBlockType=DataBlockType.Read
               }
               },
               Items=new List<Item>
               {
               new ItemIo
               {
               Id=Guid.NewGuid( ).ToString( ),
               Name="IN_NORMAL_POSITION",
               DataType=ItemDataType.Discrete,
               MicroServerId=microServerId,
               ItemAddress="10003",
               Units="bit",
               OpcItemAddress="ATS1_IN_NORMAL_POSITION"
               }
               }
               }
               }
            }
         }
   }
};
```

The invention claimed is:

1. A method for monitoring and controlling a plurality of industrial energy devices, wherein the method is performed by a system having a server and an interface device coupled to the industrial energy devices, the method comprising:
   sending configuration data from the server to the interface device, wherein:
      the configuration data includes a port definition for each port on the interface device coupled to an industrial energy device and a device definition for each industrial energy device coupled to the interface device; and
      each device definition specifies a unique ID and network address for one of the industrial energy devices, memory registers at which data is to be read from and written to on the industrial energy device, and one or more variable definitions that reference data at specific memory registers on the industrial energy device;
   reading the configuration data received at the interface device;
   dynamically configuring one or more ports on the interface device in accordance with the port definitions in order to enable the interface device to read output data from and write control data to the industrial energy devices coupled to the interface device;
   dynamically allocating memory on the interface device for the defined variables in the device definitions;
   periodically reading output data at each industrial energy device coupled to the interface module, wherein the output data is read from memory registers on the industrial energy device specified in the device definition for the industrial energy device;
   determining values for the defined variables in the configuration data using the read output data;
   monitoring the plurality of industrial energy devices on the server by receiving values from the interface device for one or more of the defined variables in the configuration data; and
   controlling one of the industrial energy devices by sending a write request to the interface device with a value for one of the defined variables in the device definition for the industrial energy device; and
   in response to receiving the write request at the interface device, retrieving the variable definition for the variable in the write request, identifying the memory register on the applicable industrial energy device referenced in the definition, and writing the value in the write request to said memory register on the applicable industrial energy device.

2. The method of claim 1, wherein the output data includes a plurality of data items and wherein determining the values of the variables comprises:
   for each data item in the output data, determining if there is a variable definition in the configuration data that references the data item and, in response to identifying a variable definition that references the data item, determining a value for the defined variable using the data item.

3. The method of claim 1 further comprising:
   updating the configuration data at the interface device in response to a change in the industrial energy devices coupled to the interface device.

4. The method of claim 3, wherein updating the configuration data comprises deleting configuration data for an industrial energy device disconnected from the interface device and adding configuration data for a new industrial energy device connected to the interface device.

5. The method of claim 3, further comprising dynamically reconfiguring ports and reallocating memory as required by updates to the configuration data.

6. The method of claim 1, wherein at least one variable definition includes a scale and determining a value of said variable includes obtaining a data point in the output data and scaling the data point as specified in the definition for the variable.

7. The method of claim 1, wherein at least one variable definition includes a condition statement and determining the value of said variable includes evaluating whether the condition statement is true or false.

8. A system for monitoring and controlling a plurality of industrial energy devices, the system comprising:
   a server; and
   an interface device in communication with the server and operatively coupled to the plurality of industrial energy devices to read data from and write data to the industrial energy devices, wherein the interface device has a dynamically configurable runtime operation for processing output data from the industrial equipment devices, wherein the runtime operation is dictated by configuration data that is received from the server and updated by the server as needed, wherein the configuration data includes a port definition for each port on the interface device coupled to an industrial energy device and a device definition for each industrial energy device coupled to the interface device, wherein each device definition specifies a unique ID and network address for one of the industrial energy devices, memory registers at which data is to be read and written to on the industrial energy device, and one or more variable definitions that reference data at specific memory registers on the industrial energy device, and wherein, in response to receiving configuration data from the server, the interface device performs the following:
      dynamically configuring one or more ports on the interface device in accordance with the port definitions in order to enable the interface device to read output data from and write control data to the industrial energy devices coupled to the interface device;
      dynamically allocating memory on the interface device for the defined variables in the device definitions;
      periodically reading output data at each industrial energy device coupled to the interface module, wherein the output data is read from memory registers on the industrial energy device specified in the device definition for the industrial energy device; and
      determining values for the defined variables in the configuration data using the read output data; and
   wherein the server monitors the plurality of industrial energy devices by receiving values from the interface device for one or more of the defined variables in the configuration data, and controls one of the industrial energy devices by sending a write request to the interface device with a value for one of the defined variables in the device definition for the industrial energy device.

9. The system of claim 8, wherein the interface device is configured to dynamically reconfigure ports and reallocate memory as required by updates to the configuration data.

10. The system of claim 8, wherein at least one variable definition includes a scale and determining a value of said variable includes obtaining a data point in the output data and scaling the data point as specified in the definition for the variable.

11. The system of claim 8, wherein at least one variable definition includes a condition statement and determining the value of said variable includes evaluating whether the condition statement is true or false.

12. A method for monitoring and controlling a plurality of industrial energy devices in a system having a server and an interface device coupled to the industrial energy devices, the method performed by the interface device and comprising:
    obtaining configuration data from the server, wherein:
        the configuration data includes a port definition for each port on the interface device coupled to an industrial energy device and a device definition for each industrial energy device coupled to the interface device; and
        each device definition specifies a unique ID and network address for one of the industrial energy devices, memory registers at which data is to be read from and written to on the industrial energy device, and one or more variable definitions that reference data at specific memory registers on the industrial energy device;
    reading the configuration data;
    dynamically configuring one or more ports in accordance with the port definitions in order to enable the interface device to read output data from and write control data to the industrial energy devices coupled to the interface device;
    dynamically allocating memory for the defined variables in the device definitions;
    periodically reading output data at each industrial energy device coupled to the interface module, wherein the output data is read from memory registers on the industrial energy device specified in the device definition for the industrial energy device;
    determining values for the defined variables in the configuration data using the read output data;
    sending the server data pertaining to the industrial energy devices by sending the server values for the defined variables; and
    in response to receiving a request from the server to write a variable value to an industrial energy device, retrieving the variable definition for the variable in the write request, identifying the memory register on the applicable industrial energy device referenced in the definition, and writing the value in the write request to said memory register on the applicable industrial energy device.

13. The method of claim 12, wherein the output data includes a plurality of data items and wherein determining the values of the variables comprises:
    for each data item in the output data, determining if there is a variable definition in the configuration data that references the data item and, in response to identifying a variable definition that references the data item, determining a value for the defined variable using the data item.

14. The method of claim 12 further comprising:
    obtaining updated configuration data at the interface device in response to a change in the industrial energy devices coupled to the interface device.

15. The method of claim 14, further comprising dynamically reconfiguring ports and reallocating memory as required by updates to the configuration data.

16. The method of claim 12, wherein at least one variable definition includes a scale and determining a value of said variable includes obtaining a data point in the output data and scaling the data point as specified in the definition for the variable.

17. The method of claim 12, wherein at least one variable definition includes a condition statement and determining the value of said variable includes evaluating whether the condition statement is true or false.

18. A computer program embodied on one or more non-transitory computer-readable mediums and comprising code that when executed by a computer system, enables the computer system to perform the following method for monitoring and controlling a plurality of industrial energy devices in a system having a server and an interface device coupled to the industrial energy devices, the method comprising:
    sending configuration data from the server to the interface device, wherein:
        the configuration data includes a port definition for each port on the interface device coupled to an industrial energy device and a device definition for each industrial energy device coupled to the interface device; and
        each device definition specifies a unique ID and network address for one of the industrial energy devices, memory registers at which data is to be read from and written to on the industrial energy device, and one or more variable definitions that reference data at specific memory registers on the industrial energy device;
    reading the configuration data received at the interface device;
    dynamically configuring one or more ports on the interface device in accordance with the port definitions in order to enable the interface device to read output data from and write control data to the industrial energy devices coupled to the interface device;
    dynamically allocating memory on the interface device for the defined variables in the device definitions;
    periodically reading output data at each industrial energy device coupled to the interface module, wherein the output data is read from memory registers on the industrial energy device specified in the device definition for the industrial energy device;
    determining values for the defined variables in the configuration data using the read output data;
    monitoring the plurality of industrial energy devices on the server by receiving values from the interface device for one or more of the defined variables in the configuration data; and
    controlling one of the industrial energy devices by sending a write request to the interface device with a value for one of the defined variables in the device definition for the industrial energy device; and
    in response to receiving the write request at the interface device, retrieving the variable definition for the variable in the write request, identifying the memory register on the applicable industrial energy device referenced in the definition, and writing the value in the write request to said memory register on the applicable industrial energy device.

19. The computer program of claim 18, wherein the output data includes a plurality of data items and wherein determining the values of the variables comprises:
 for each data item in the output data, determining if there is a variable definition in the configuration data that references the data item and, in response to identifying a variable definition that references the data item, determining a value for the defined variable using the data item.

20. The computer program of claim 18, further comprising:
 updating the configuration data at the interface device in response to a change in the industrial energy devices coupled to the interface device.

\* \* \* \* \*